United States Patent [19]

Lew et al.

[11] Patent Number: 4,546,792
[45] Date of Patent: Oct. 15, 1985

[54] BALL-PLUG PENDULUM CHECK VALVE

[76] Inventors: Hyok S. Lew, 7890 Oak St., Arvada, Colo. 80005; Michael Stranahan, P.O. Box 15, Woody Creek, Colo. 81656

[21] Appl. No.: 562,840

[22] Filed: Dec. 19, 1983

Related U.S. Application Data

[63] Continuation-in-part of Ser. No. 372,462, Apr. 28, 1982.

[51] Int. Cl.[4] .............................................. F16K 15/03
[52] U.S. Cl. .................................. 137/527; 137/527.8
[58] Field of Search ........................... 137/527, 527.8; 251/298, 303

[56] References Cited

U.S. PATENT DOCUMENTS

| | | | |
|---|---|---|---|
| 3,610,163 | 10/1971 | Edwards et al. | 137/527 |
| 4,150,811 | 4/1979 | Condit | 251/298 |
| 4,230,150 | 10/1980 | Scaramucci | 137/527 |
| 4,258,925 | 3/1981 | Guyton | 137/527 |
| 4,433,702 | 2/1984 | Baker | 137/527 |

Primary Examiner—Martin P. Schwadron
Assistant Examiner—James R. Shay

[57] ABSTRACT

This invention relates to a check valve having a straight-through flow passage wherein a ball-plug of a cylindrical geometry with a hemispherical end is pendulously confined in a cavity included in the valve body. The ball-plug has a through-hole with the central axis substantially passing through the center of a spherical surface including the hemispherical end of the ball-plug, which central axis substantially intersects the central axis of the ball-plug in an oblique angle. The ball-plug is pendulously confined in the cavity within the valve body by a trunnion in such a way that the ball plug is allowed to swing on a plane including the central axis of the flow passage of the check valve passing through the cavity confining the ball plug and the central axis of the ball plug. At one extreme position in the swinging movement, the through-hole included in the ball plug lines-up with the flow passage allowing straight-through flow for the fluid from one extremity to the other extremity of the check valve. At the other extreme position in the swinging movement a portion of the hemispherical end of the ball-plug adjacent to the wall of the through-hole plugs up the flow pass.

8 Claims, 6 Drawing Figures

BALL-PLUG PENDULUM CHECK VALVE

This patent application is a continuation-in-part application to patent application Ser. No. 372,462 entitled "Ball Plug Valve" filed on Apr. 28, 1982.

BACKGROUND OF THE INVENTION

Check valves of various designs are employed in many industries with plants having the fluid handling systems. Among many different check valves, the ball check valve with a spring biased ball or with a free floating ball is the most popular, for it is more reliable, compact, and economic compared with other types of check valves. However, these highly popular ball check valves have a number of short-comings. The ball check valve is not a straight-through flow type check valve because the ball is always in the way of the flow passage. Since the ball is in the middle of the fluid stream, the surface of the ball wears rapidly when the fluid stream is of an abrasive nature and, consequently, it causes a leak in checking the back flow. The ball check valve is not a slow-acting check valve because the ball slams back to the checking seat when there is a reverse pressure gradient of a large magnitude. The ball check valve is a truly ideal check valve only if it has a straight-through flow passage and is capable of withstanding a reverse pressure gradient of a large magnitude.

The primary object of the present invention is to provide the ball-plug pendulum check valve with the straight-through flow passage while it checks the reverse flow in the bubble-tight manner like a conventional ball check valve.

Another object of the present invention is to provide the ball-plug pendulum check valve with a large bearing surface for the ball-plug, which bearing surface is separated from the seating surface.

A further object of the present invention is to provide the ball-plug pendulum check valve with slowly acting capability under a sudden reverse pressure gradient, which operates smoothly under a large reverse pressure surge without creating water hammering.

Still another object of the present invention is to provide the ball-plug pendulum check valve wherein the seating surface and the seal arrangement for checking the reverse flow is protected from the abrasive action of the flow.

Still a further object of the present invention is to provide a check valve applicable to fluid handling at an extremely high pressure.

These and other objects of the present invention will become clear as the description thereof proceeds.

BRIEF DESCRIPTION OF FIGURES

The present invention and its objects may be described with a greater clarity and specificity by referring to the following Figures.

SPECIFICATION

Figure 1:
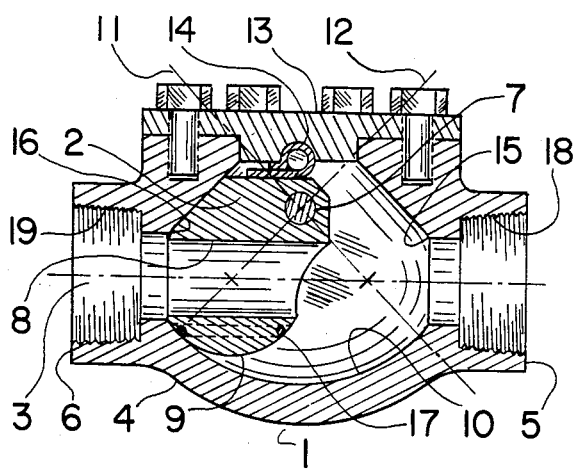
FIG. 1 illustrates a cross section of a ball-plug pendulum check valve with the ball-plug swung to the fully open position, wherein the cross section is taken along a plane including the central axis is of the ball-plug and the central axis of the flow passage.
Figure 2:
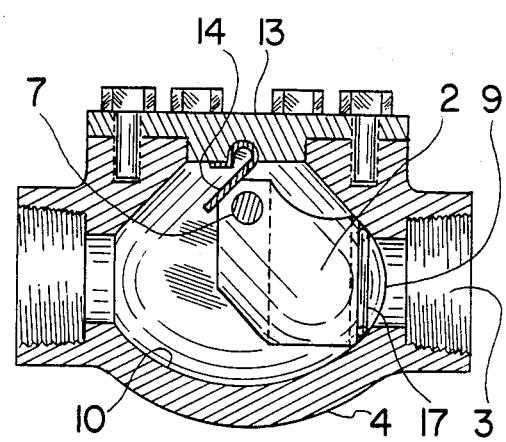
FIG. 2 illustrates a cross section of the ball-plug pendulum check valve shown in FIG. 1 with the ball-plug swung to the fully closed position.

In FIG. 1 there is shown a cross section of a ball-plug pendulum check valve 1 constructed in accordance with the principles of the present invention, which cross section is taken along a plane including the central axis of the ball plug 2 and the central axis of the straight-through flow passage 3 disposed through the valve body 4 and extending from one extremity 5 to the other extremity 6 of the valve body 4. It is helpful to remember that said plane is a plane on which the ball-plug 2 swings about the pivoting pin 7 substantially passing through the central axis of the ball-plug 2 and is off-set from the center line of the through-hole 8 disposed through the ball plug 2 in an oblique angle with respect to the central axis of the ball plug 2. The ball plug 2 has a cylindrical geometry with a hemispherical end 9 at the swinging end, of which the pivoted end is provided with the taper trims so that the ball-plug 2 may pivot about the pivoting pin 7 with the minimum amount of elbow room. The center line of the through hole 8 substantially passes through the center of a spherical surface including the hemispherical end 9 of the ball-plug 2. The ball-plug 2 is confined in a cavity 10 within the valve body 4, which cavity comprises a pair of the cylindrical cavities with a closed hemispherical end matched to the ball-plug in dimensions wherein the central axis 11 and 12 of said two cylindrical cavities cross each other at the center line of the pivoting pin 7 and said two cylindrical cavities are integrated into a single cavity 10 by removing the materials therebetween in such a way that the ball-plug 2 is allowed to swing from one extreme position defined by the first of said two cylindrical cavities to the other extreme position defined by the second of said two cylindrical cavities. In other words, the cavity 10 includes a first surface coinciding with one of two symmetrical halves of the surface of the ball-plug 2 when said ball-plug 2 is swung to one extreme position wherein the central axis of the flow passage 3 substantially passes through the center of a spherical surface including the hemispherical end 9 of the ball-plug 2 and intersects with the central axis of the ball-plug 2 in 45 degree angle; a second surface coinciding with the other of two symmetrical halves of the surface of the ball-plug 2 when said ball-plug 2 is swung to the other extreme position wherein the central axis of the flow passage 3 substantially passes through the center of a spherical surface including the hemispherical end 9 of the ball-plug 2 and intersects with the central axis of the ball-plug 2 in 135 degree angle; whereby, said first surface and said second surface are disposed in a mirror image to one another wherein said central axis associated with said first surface and said central axis associated with said second surface intersect one another at a point off-set from the central axis of the flow passage 3 in 90 degree angle; and a void space intermediate said first surface and said second surface providing room for the ball-plug 2 to swing from said one extreme position to said the other extreme position. The central axis of the pivoting pin 7 passes through the intersection point between said central axis associated with said first surface and said central axis associated with said second surface and intersects in 90 degree angle therewith. The open end of the cavity 10 is capped by the closure 13 in a leak-proof fashion wherein the closure 13 is fastened to the valve body 4 by means of the plurality of bolts in the illustrated embodiment. The spring bias means 14 anchored in and supported by the closure 13, provides a spring force that swings the ball-plug 2 from the fully open position as shown in FIG. 1 to the fully closed position as shown in FIG. 2 when there is no fluid pressure difference across the ball-plug 2 that creates the force on the ball-plug keeping it at the fully open position. It should be understood that the seats 15 and 16 disposed on the wall of the cavity 10 around the flow passage hole 3 is of a spherical surface matched to the hemispherical end 9 of the ball-plug 2 and, consequently, it can be made to provide a leak-proof contact between each of said seats and the hemispherical end 9 of the ball-plug 2 at the fully open and fully closed positions. In order to ensure a leak-proof check against the back flow, a resilient annular seal 17 is disposed within a groove formed on the hemispherical end 9 of the ball-plug 2 on a plane substantially perpendicular to the central axis of the flow pass 3 when the ball-plug 2 is swung to the fully closed position as shown in FIG. 2. Both extremities of the flow passage 3 are provided with the connection means 18 and 19 for connecting the ball-plug pendulum check valve 1 to a pipe line. The pivoting pin 7 may be anchored to the valve both 10 rotatably or nonrotatably at boty sides of the ball-plug 2. It can be easily noticed that the spring bias means 14 may be disposed around the pivoting pin 7 instead of the bottom of the closure 13. The opening of the cavity 10 should be wide enough to provide an access into the cavity 10 for the ball-plug 2.

In FIG. 2 there is shown the same cross section of the ball-plug pendulum check valve of FIG. 1 illustrating the ball-plug 2 swung to the fully closed position. When the fluid is flowing from the extremity 5 to the extremity 6, the pressure difference across the ball-plug 2 keeps the ball-plug 2 at the fully open position against the force of the spring bias means as shown in FIG. 1. When a reverse pressure gradient reaches the ball-plug 2, the ball-plug 2 swings to the fully closed position under the combined force of the reverse pressure gradient and the force of the spring bias means 14 as shown in FIG. 2. A forward pressure gradient will swing open the ball-plug 2 back to the fully open position as shown in FIG. 1. The resilient annular seal 17 provides a leak-proof check against the back flow when the ball-plug 2 is swung to the fully closed position.

Figure 3:
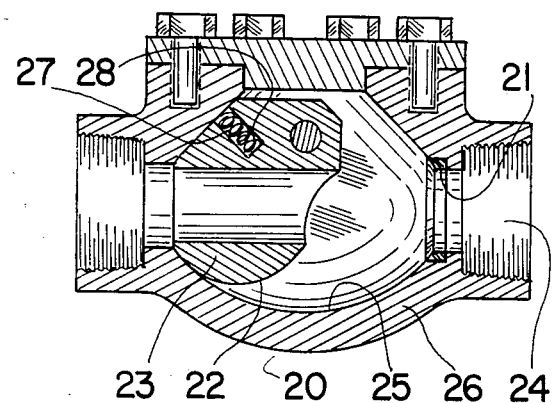
FIG. 3 illustrates a cross section of another ball-plug pendulum check valve with different spring bias means.

In FIG. 3, there is shown a cross section of another ball-plug pendulum check valve 20 having essentially the same construction as that of FIG. 1 with two exceptions: The resilient annular seal 21 with a face matched to the hemispherical end 22 of the ball-plug 23 is disposed in a counter bore formed around the flow passage 24 adjacent to the cavity 25 within the valve body 26. The coil spring 27 disposed and secured in a hole 28 formed into the front side of the ball-plug 23 provides the spring bias force that swings the ball-plug 23 to the fully closed position when the forward fluid pressure gradient is absent.

Figure 4:
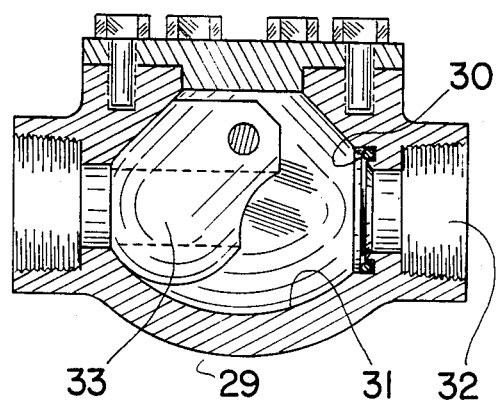
FIG. 4 illustrates a cross section of a further ball-plug pendulum check valve with gravity bias means.

The embodiment of a further ball-plug pendulum check valve 29 shown in FIG. 4 has essentially the same construction as that of FIG. 3 with two exceptions: The annular seal 30 is disposed and secured in a groove formed into the wall of the cavity 31 around the flow passage 32 and there is no mechanical spring bias means of swinging the ball-plug 33 to the fully closed position as said role of the spring bias is taken over by the weight of the ball-plug. Consequently, the ball-plug pendulum check valve 29 of FIG. 4 has to be installed in the horizontal up-right position as shown, while other ball-plug pendulum check valves shown in other Figures may be installed in any position with respect to the direction of the earth's gravitational force.

Figure 5:
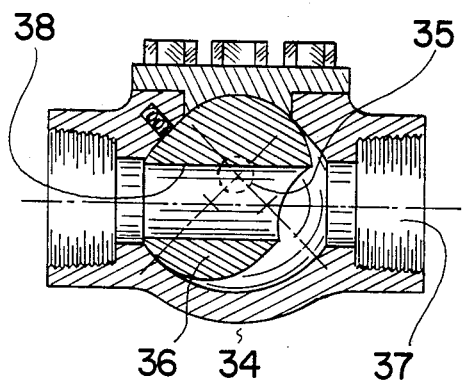
FIG. 5 illustrates a cross section of a ball-plug pendulum check valve with a short arm of the swing providing a compact design

In FIG. 5, there is shown a ball-plug pendulum check valve 34 of an extra compact design wherein the trunnion 35 extending transversely from both sides of ball-plug 36 provides the pivoting axis for the ball-plug 36. It should be noticed that the trunnion 35 is off-set from the central axis of the flow passage 37 by a distance much smaller than that of the pivoting pin shown in FIGS. 1, 2, 3 and 4 and that the trunnion 35 does not transverse across the through-hole 38 disposed in the ball-plug 36 while the pivoting pin 7 in FIG. 1 may extend through the ball-plug 2. The construction and the operating principles of the ball-plug pendulum check valve 34 is the same as that shown in FIGS. 1 and 2 as the trunnion 35 plays the same role as the pivoting pin 7 of FIG. 1.

Figure 6:
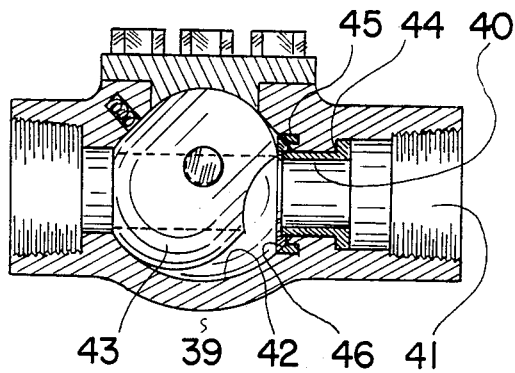
FIG. 6 illustrates a cross section of a ball-plug pendulum check valve with a shield sleeve for protecting the seating surface and the annular seal from the abrasive action of the fluid stream.

In FIG. 6, there is shown a cross section of a ball-plug pendulum check valve 39 similar to that shown in FIG. 5 with a sliding shield sleeve 40 slidably installed in the flow passage 41 adjacent to the cavity 42, which sliding shield sleeve is slidable over a small distance. When the ball-plug 43 is located at the fully open position, one end of the sliding shield sleeve 40 slightly protrudes into the cavity 42 as a result of the drag force of the moving fluid wherein the amount of said protrusion is checked by the shoulder 44 of the sliding shield sleeve 40, which protruding end of the sliding shield sleeve protects the resilient annular seal 45 and the seat 46 from the abrasive fluid stream moving through the ball-plug pendulum check valve. When the ball-plug 43 is swung to the fully closed position, the sliding shield sleeve 40 completely retracts into the flow passage 41 as it is pushed by the ball-plug and, consequently, a full leak-proof check against the back flow is accomplished by the ball-plug 43 seating on the resilient annular seal 45 and the seat 46 without being interfered by the sliding shield sleeve 40.

While the principles of the invention have now been made clear by the illustrative embodiments, there will be immediately obvious to the skilled in the art many modifications of the arrangements, elements, proportion, and materials particularly adapted to the specific working environment and operating condition in the practice of the invention without departing from those principles of the present invention.

We claim:

1. A ball-plug pendulum check valve comprising in combination:

(a) a ball-plug of a circular cylindrical geometry having a substantially hemispherical end, said ball-plug including a through-hole with central axis substantially passing through the center of a spherical surface including said hemispherical end of said ball-plug and intersecting with the central axis of said ball-plug in an oblique angle;

(b) a valve body including a flow passage extending from one extremity to the other extremity of said valve body and a cavity pivotably housing said ball-plug disposed intermediate said one extremity and said the other extremity of said valve body, said cavity including a first surface substantially coinciding with one of two symmetrical halves of the surface of said ball-plug when said ball-plug is swung to one extreme position wherein the central axis of said flow passage substantially passes through the center of a spherical surface including said hemispherical end of said ball-plug and substantially intersects with the central axis of said ball-plug in an oblique angle; a second surface substantially coinciding with the other of two symmetric halves of the surface of said ball-plug when said ball-plug is swung to the other extreme position opposite to said one extreme position wherein the central axis of said flow passage substantially passes through the center of a spherical surface including said hemispherical end of said ball-plug and substantially intersects with the central axis of said ball-plug in another oblique angle, said first surface and said second surface disposed substantially in a mirror image to one another with respect to a plane perpendicular to the central axis of said flow passage wherein said central axis associated with said first surface and said central axis associated with said second surface intersect one another at a point off-set from the central axis of said flow passage; and a void space intermediate said first surface and said second surface providing room for said ball-plug to swing from said one extreme position to said the other extreme position, wherein said through-hole included in said ball-plug substantially lines up with said flow passage included in said valve body when said ball-plug is swung to said one extreme position;

(c) at least one pivoting pin pivotably securing said ball-plug to said valve body wherein the central axis of said pivoting pin substantially passes through said point of intersection between said central axis associated with said first surface and said central axis associated with said second surface in an angle perpendicular to said central axes associated with said first and second surfaces; and (d) means included in said first and second extremities of said valve body for connecting said valve body to pipe line.

2. The combination as set forth in claim 1 wherein said combination includes spring bias means providing a force swinging said ball-plug to said the other extreme position when the force from the fluid pressure keeping said ball-plug at said one extreme position is small.

3. The combination as set forth in claim 1 wherein said combination includes a resilient annular seal disposed in said hemispherical end of said ball-plug on a plane off-set from said through-hole and substantially parallel to the central axis of said through-hole.

4. The combination as set forth in claim 1 wherein said combination includes a resilient annular seal disposed around said flow passage in said second surface included in said cavity on a plane substantially perpendicular to the central axis of said flow passage.

5. The combination as set forth in claim 3 wherein said combination includes spring bias means providing force swinging said ball-plug to said the other extreme position when the force from the fluid pressure keeping said ball-plug at said one extreme position is small.

6. The combination as set forth in claim 4 wherein said combination includes spring bias means providing a force swinging said ball-plug to said the other extreme position when the force from the fluid pressure keeping said ball-plug at said one extreme position is small.

7. The combination as set forth in claim 4 wherein a shielding sleeve protecting said resilient annular seal is slidably disposed in said flow passage adjacent to said second surface included in said cavity, wherein sliding movement of said shielding sleeve is limited to a small distance.

8. The combination as set forth in claim 7 wherein said combination includes spring bias means providing a force swinging said ball-plug to said the other extreme position when the force from the fluid pressure keeping said ball-plug at said one extreme position is small.

* * * * *